(12) United States Patent
Yu

(10) Patent No.: US 8,550,674 B2
(45) Date of Patent: Oct. 8, 2013

(54) SLIM LIGHT BAR

(75) Inventor: Feng Yu, Ningbo (CN)

(73) Assignee: Ningbo Yinzhou Self Photoelectron Technology Co., Ltd., Ningbo (CN)

( * ) Notice: Subject to any disclaimer, the term of this patent is extended or adjusted under 35 U.S.C. 154(b) by 265 days.

(21) Appl. No.: 13/090,245

(22) Filed: Apr. 19, 2011

(65) Prior Publication Data

US 2012/0099338 A1    Apr. 26, 2012

(30) Foreign Application Priority Data

Oct. 26, 2010   (CN) .......................... 2010 1 0519316

(51) Int. Cl.
*F21V 33/00* (2006.01)
(52) U.S. Cl.
USPC ............................. 362/493; 362/545; 362/542
(58) Field of Classification Search
USPC ................... 362/493, 544, 545, 542
See application file for complete search history.

(56) References Cited

U.S. PATENT DOCUMENTS

| | | | | |
|---|---|---|---|---|
| 5,884,997 A * | 3/1999 | Stanuch et al. | ................ | 362/493 |
| D585,318 S * | 1/2009 | Jalala | ........................ | D10/114.4 |
| 7,476,013 B2 * | 1/2009 | Gergets et al. | ................ | 362/493 |
| 7,854,531 B1 * | 12/2010 | Lyons | ........................ | 362/217.1 |
| 2007/0024461 A1 * | 2/2007 | Pederson et al. | ......... | 340/815.45 |
| 2007/0258257 A1 * | 11/2007 | Stein | ............................. | 362/493 |
| 2010/0073948 A1 | 3/2010 | Stein et al. | | |

FOREIGN PATENT DOCUMENTS

CN    201330980    10/2009

OTHER PUBLICATIONS

UK Search Report for UK Patent Application No. GB1108770.7.

* cited by examiner

*Primary Examiner* — Laura Tso

(57) ABSTRACT

The present patent application provides a slim light bar. The light bar includes a base (1), two upper side covers (2), a top cover (3), a straight light unit (4), a curved light unit (5) and a plurality of supporting legs (6). The top cover (3) is disposed in the middle of the top of the base (1). The upper side covers (2) are disposed at the two ends of the top of the base (1). The straight light unit (4) is connected to the straight sides of the base (1). The curved light unit (5) is connected to the curved sides of the two ends of the base (1). The supporting legs (6) are connected to the bottom of the base (1). The height of the base (1) is 26 mm to 29 mm. The present patent application uses LEDs with a diameter of 4.5 mm and the corresponding lenses have a maximum diameter of 14 mm so that the height of the base (1) is only 26 mm to 29 mm and the materials used for making the light bar are saved.

19 Claims, 5 Drawing Sheets

SLIM LIGHT BAR

CROSS-REFERENCE TO RELATED APPLICATIONS

This application claims the benefit of Chinese Patent Application No. 201010519316.3, filed on Oct. 26, 2010; the contents of which is hereby incorporated by reference.

FIELD OF THE PATENT APPLICATION

The present patent application relates to caution lights and more particularly to a slim light bar.

BACKGROUND

It is well known that light bars are commonly used in emergency vehicles, ambulances, highway patrol law enforcement vehicles and etc., mainly for the purpose of caution. The light bars have been widely used in China for about 20 years. The turning type light bars that have been used, although the appearance of which have many variations, mainly use tungsten light bulbs as the light source. The tungsten light bulb is a thermal light source with a low response frequency, only capable of working in the constant-on or low frequency blinking mode, and cannot work at a high frequency or generate a sense of urge. The power consumption of tungsten light bulbs is great, which increases the burden to the power supply system of the emergency vehicle. The tungsten light bulbs are not resistant to shocks, and have a short lifetime. Normally a tungsten light bulb has only a few hundred hours of lifetime. The rated lifetime of a halogen light bulb is only within 3000 hours. The electric-optical conversion efficiency for tungsten light bulbs is low, while the massive amount of heat generated thereby greatly effects the lifetime of the whole light bar. Hence, to solve the above problems, LEDs (light-emitting diodes) have been used as the light source, which have lower power consumption and longer lifetime.

The conventional light bars that are currently being used are a type of light bars that use LED as the light source. Such light bar usually includes a base, a plurality of LED light units disposed at the front and the back ends of the base, lenses that correspond to the LED light units, and supporting legs connected to the bottom of the base for connecting to the vehicle. The left and right ends of the base are connected to a light unit base respectively. An end cover and a plurality of LED lights are connected onto the light unit base.

However, the conventional light bar usually uses LEDs that have a diameter of 8 mm and a light emitting portion with a diameter of 5.8 mm. The corresponding lenses have a maximum diameter of 20 mm. The height of the light bar reaches 40 mm. The height of the light bar being too high will cause a waste of the materials for making the light bar.

SUMMARY

An object of the present patent application is to provide a slim LED light bar to overcome the disadvantages of the conventional light bar of being too high and the resulted waste of materials for making the light bar.

To achieve the above object, the present patent application provides a slim LED light bar. The light bar includes a base (1), two upper side covers (2), a top cover (3), a straight light unit (4), a curved light unit (5) and a plurality of supporting legs (6). The top cover (3) is disposed in the middle of the top of the base (1). The upper side covers (2) are disposed at the two ends of the top of the base (1). The straight light unit (4) is connected to the straight sides of the base (1). The curved light unit (5) is connected to the curved sides of the two ends of the base (1). The supporting legs (6) are connected to the bottom of the base (1). The height of the base (1) is 26 mm to 29 mm.

The straight light unit (4) includes a plurality of straight lights. Each of the straight lights includes a light base (41) and a heat dissipating plate (42), a circuit board (43) and a light cover (44) which are consecutively connected to the light base (41). The circuit board (43) is connected to a plurality of LED light (45), and the light cover (44) includes a plurality of lenses (46). The curved light unit (5) includes a plurality of curved lights. Each of the curved lights includes a light base (51) and a heat dissipating plate (52), a circuit board (53) and a light cover (54) which are consecutively connected to the light base (51). The circuit board (53) is connected to a plurality of LED light (55), and the light cover (54) includes a plurality of lenses (56).

Each of the LED lights (45) has a diameter of 4.5 mm and a light emitting portion with a diameter of 2.8 mm. Each of the LED light (55) has a diameter of 4.5 mm and a light emitting portion with a diameter of 2.8 mm.

Each of the lenses (46) has a maximum diameter of 14 mm and each of the lenses (56) has a maximum diameter of 14 mm.

The top surface of the light cover (44) is a plane or includes a plurality of periodic curved surfaces. The top surface of the light cover (54) is a plane or includes a plurality of periodic curved surfaces.

The curved surfaces have a curved cross section, the radius of the curvature being 4 mm.

The outer walls of the lenses (46) and the lenses (56) have a curved cross section, the radius of the curvature being 35 mm.

A hole is formed on each of the lenses (46) and the lenses (56) respectively. The light emitting portions of the LED lights (45) and the LED lights (55) are inserted into the holes respectively. One end of each hole opens at the center of the bottom of the lens and extends toward a direction that is perpendicular to the top of the lens. The other end of the hole is terminated inside of the lens. A curved protrusion is formed on the top of each lens at the opening of the hole, the radius of the curvature of the curved protrusion being 3 mm.

Each of the curved lights in the curved light unit (5) is independently configured, and under the condition that no change is made to the other curved lights, curved lights at different angles may be replaced according to a specific requirement.

The upper side covers (2) are connected to the two ends of the top of the base (1) through screws, and the screws are installed above the upper side covers (2).

Compared to the conventional technologies, the solutions provided by the present patent application have the following advantages.

The present patent application uses LEDs with a diameter of 4.5 mm and the corresponding lenses have a maximum diameter of 14 mm, so that the height of the base of the light bar is only 26 mm to 29 mm, and thereby the materials for making the light bar are saved.

BRIEF DESCRIPTIONS OF THE DRAWINGS

DETAILED DESCRIPTION

Reference will now be made in detail to a preferred embodiment of the slim light bar disclosed in the present patent application, examples of which are also provided in the following description. Exemplary embodiments of the slim light bar disclosed in the present patent application are described in detail, although it will be apparent to those skilled in the relevant art that some features that are not particularly important to an understanding of the slim light bar may not be shown for the sake of clarity.

Furthermore, it should be understood that the slim light bar disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
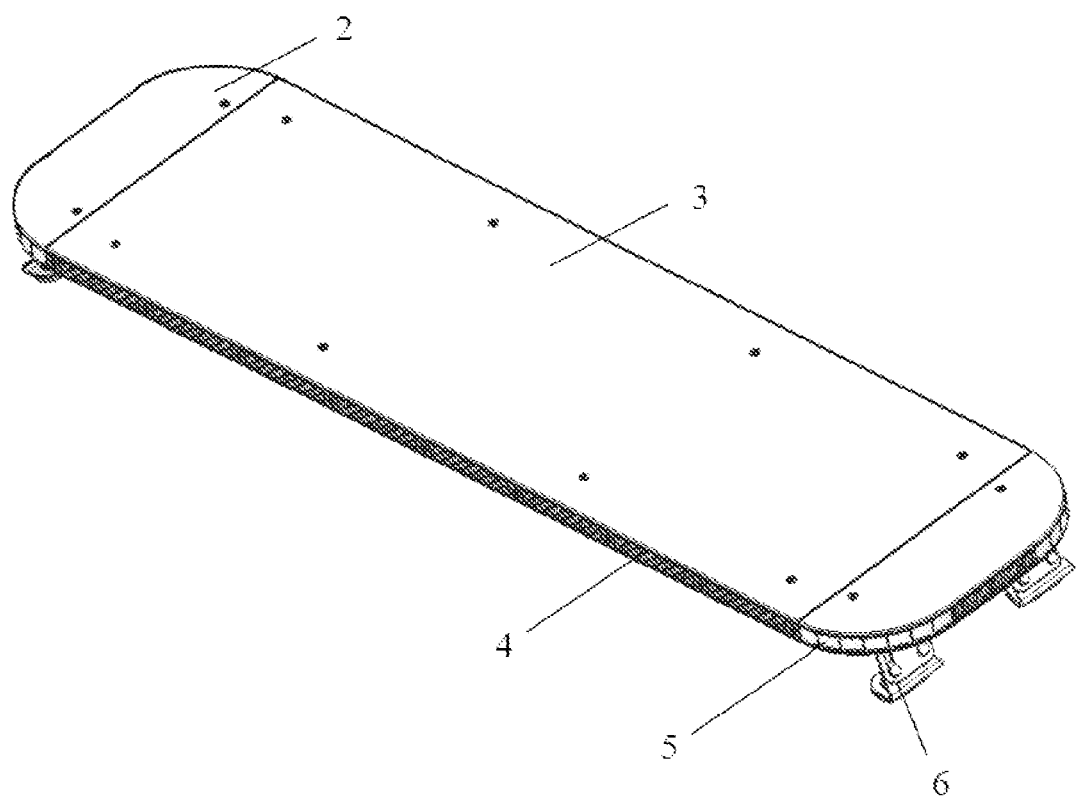
FIG. 1 illustrates the structure of a slim light bar according to an embodiment of the present patent application.
Figure 2:
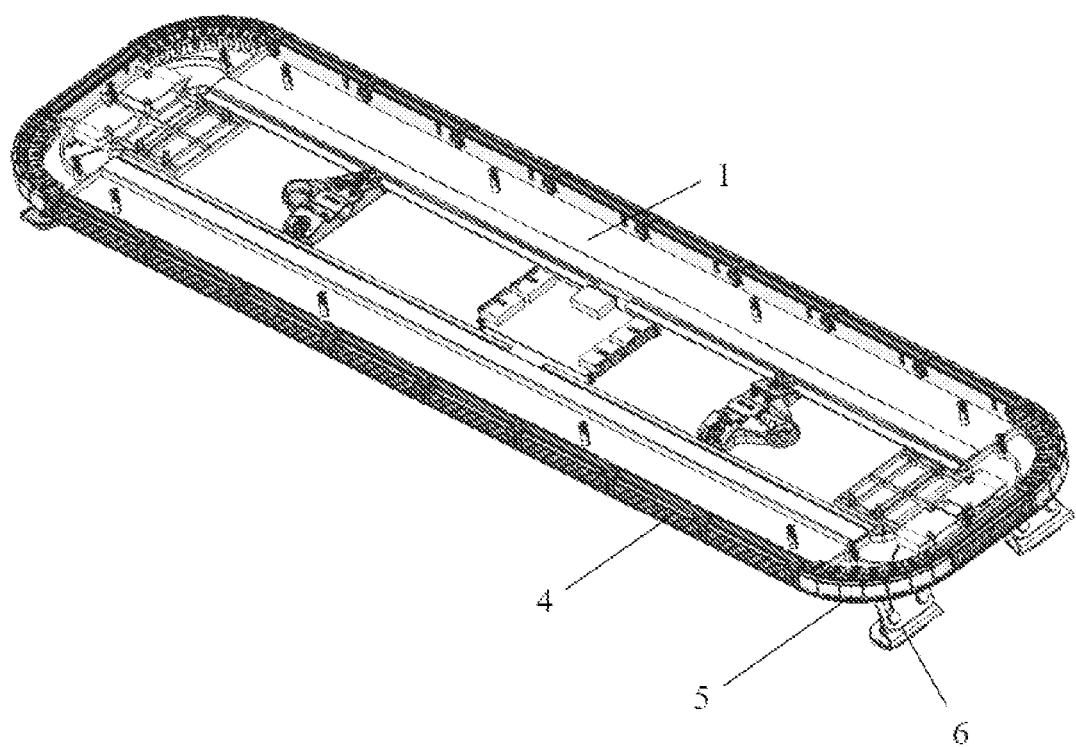
FIG. 2 illustrates the slim light bar depicted in FIG. 1 after the upper side cover and the top cover are removed.

FIG. 1 and FIG. 2 illustrate the structure of a slim light bar according to an embodiment of the present patent application. The slim light bar includes a base 1, two upper side covers 2, a top cover 3, a straight light unit 4, a curved light unit 5 and a plurality of supporting legs 6. The top cover 3 is disposed in the middle of the top of the base 1. The upper side covers 2 are disposed at the two ends of the top of the base 1. The straight light unit 4 is connected to the straight sides of the base 1. The curved light unit 5 is connected to the curved sides of the two ends of the base 1. The supporting legs 6 are connected to the bottom of the base 1. The height of the base 1 is 26 mm to 29 mm.

Figure 3:
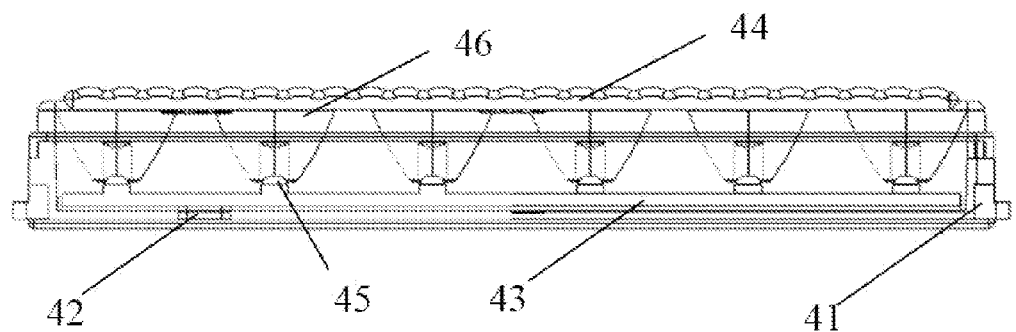
FIG. 3 illustrates the structure of a straight light unit of a slim light bar according to an embodiment of the present patent application.
Figure 4:
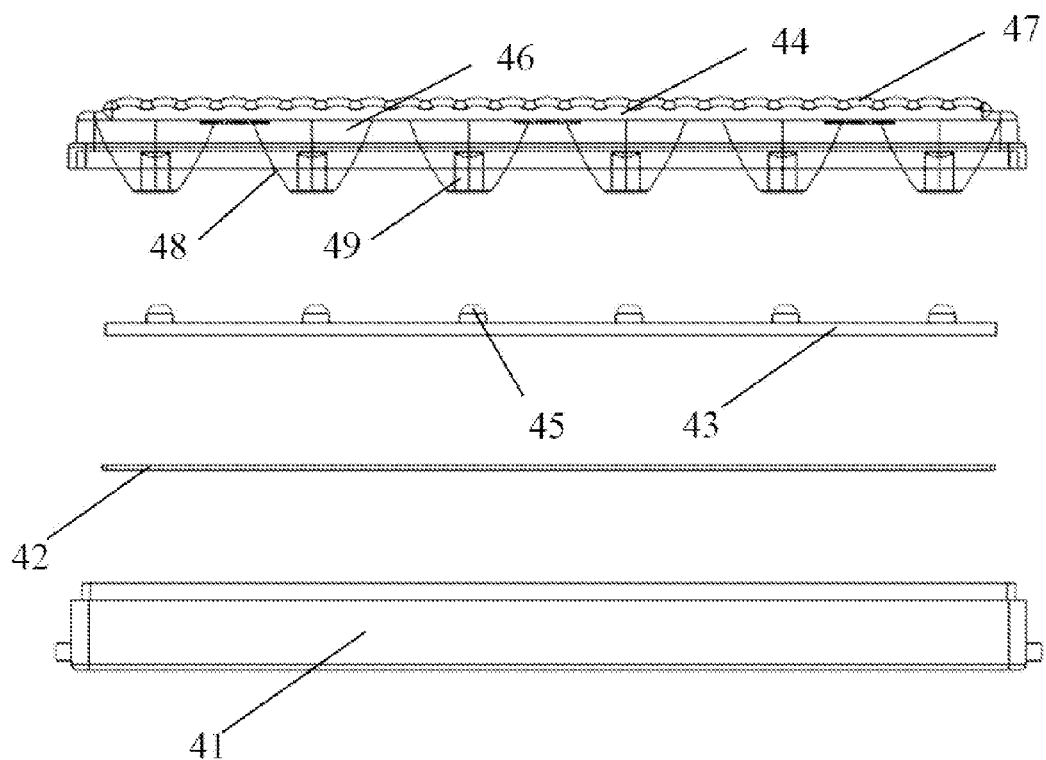
FIG. 4 is an exploded view of the straight light unit depicted in FIG. 3.

FIG. 3 and FIG. 4 illustrate the structure of a straight light unit of a slim light bar according to an embodiment of the present patent application. The straight light unit includes a plurality of straight lights. Each of the straight lights includes a light base 41 and a heat dissipating plate 42, a circuit board 43 and a light cover 44 which are consecutively connected to the light base 41. The circuit board 43 is connected to a plurality of LED lights 45. The light cover 44 includes a plurality of lenses 46. In this embodiment, each of the LED lights 45 has a diameter of 4.5 mm and a light emitting portion with a diameter of 2.8 mm. Each of the lenses 46 has a maximum diameter of 14 mm. The top surface of the light cover 44 includes a plurality of periodic curved surfaces 47. The curved surfaces 47 have a curved cross section, the radius of the curvature being 4 mm. The outer wall of the each of the lenses 46 has a curved cross section, the radius of the curvature being 35 mm. A hole 49 is formed on the each of the lenses 46. The light emitting portion of each of the LED lights 45 is inserted into each of the holes respectively. One end of the hole opens at the center of the bottom of the lens and extends toward a direction that is perpendicular to the top of the lens. The other end of the hole is terminated inside of the lens. A curved protrusion is formed on the top of the lens at the opening of the hole, the radius of curvature of the curved protrusion being 3 mm.

Figure 5:
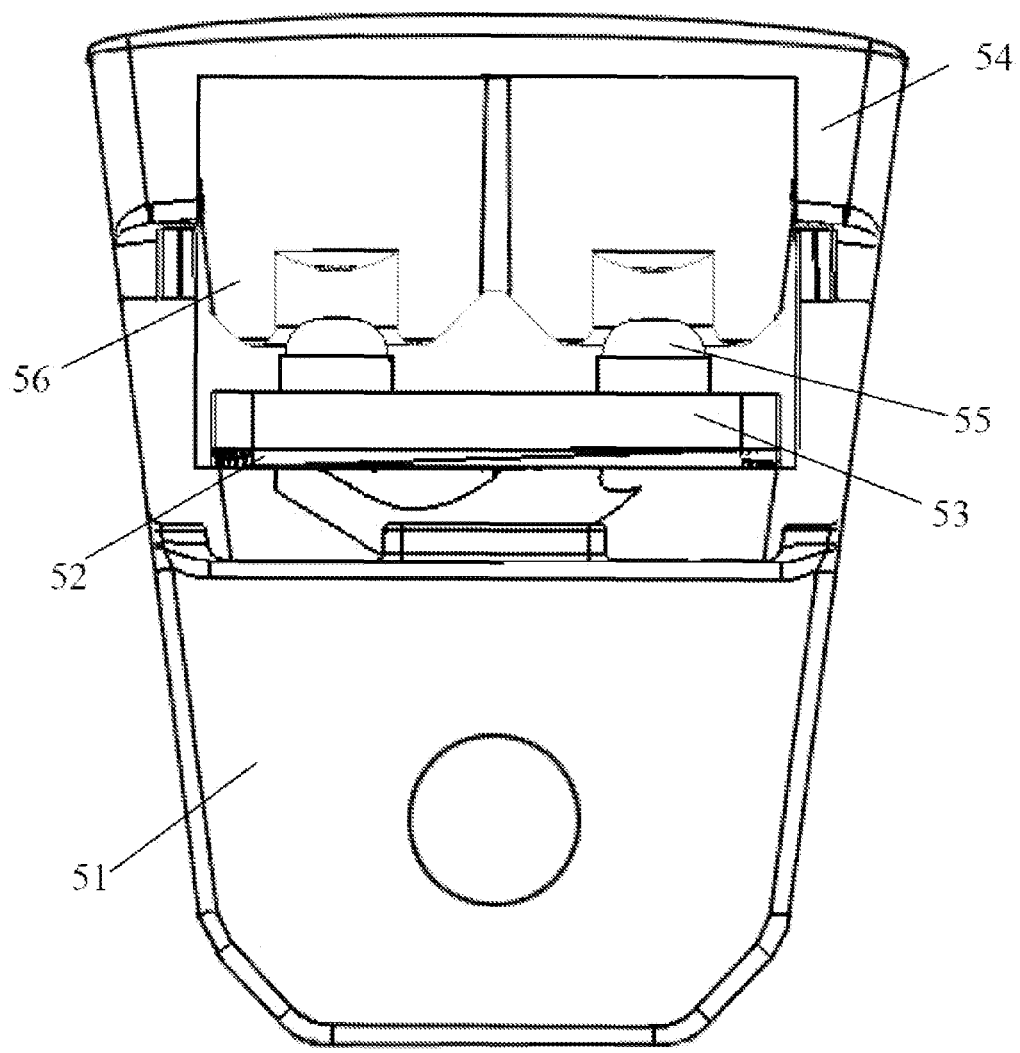
FIG. 5 illustrates the structure of a curved light unit of a slim light bar according to an embodiment of the present patent application.
Figure 6:
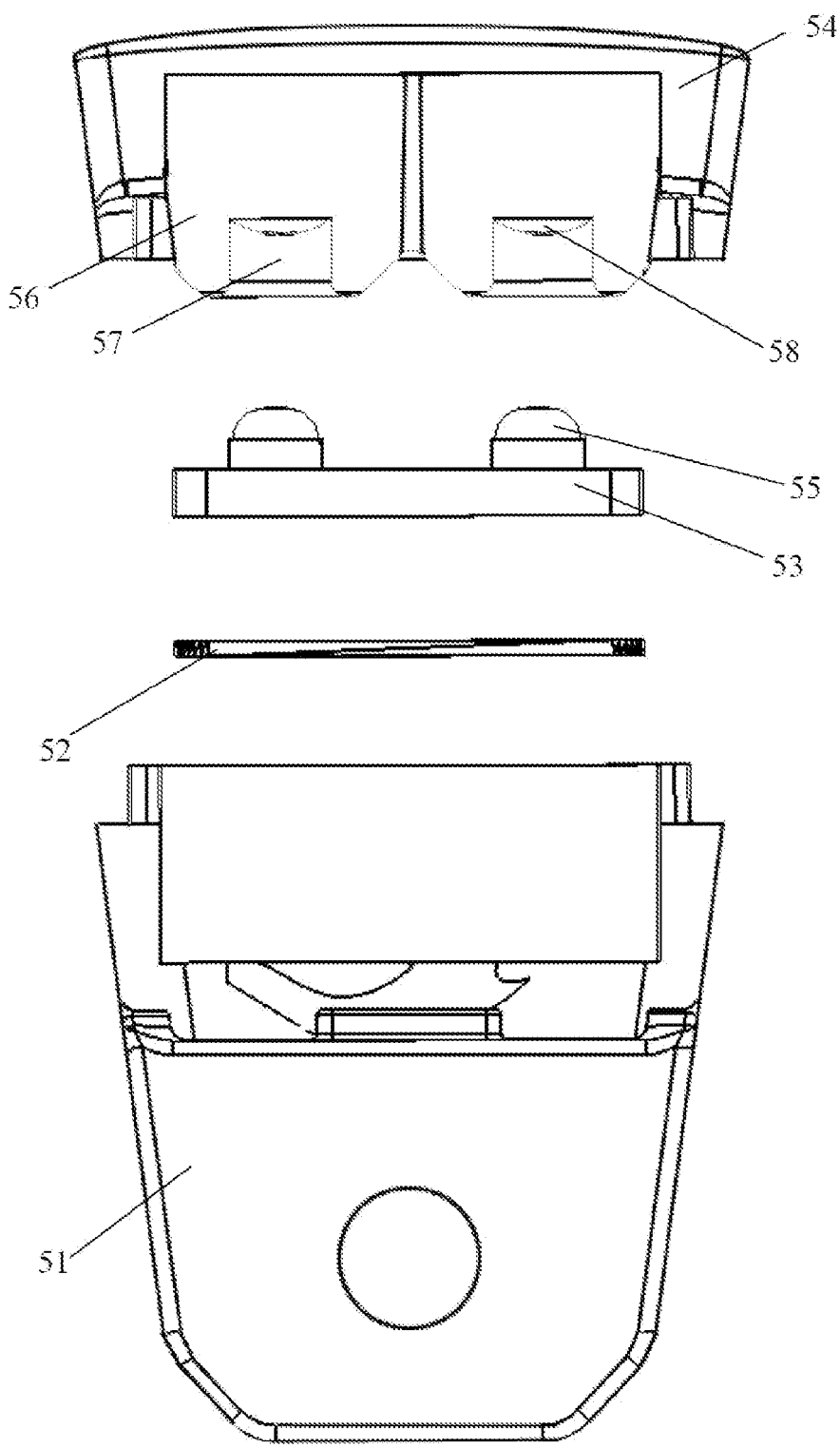
FIG. 6 is an exploded view of the curved light unit depicted in FIG. 5.

FIG. 5 and FIG. 6 illustrate the structure of a curved light unit of a slim light bar according to an embodiment of the present patent application. The curved light unit includes a plurality of curved lights. Each of the curved lights includes a light base 51 and a heat dissipating plate 52, a circuit board 53 and a light cover 54 which are consecutively connected to the light base 51. The circuit board 53 is connected to a plurality of LED lights 55. The light cover 54 includes a plurality of lenses 56. In this embodiment, each of the LED lights 55 has a diameter of 4.5 mm and a light emitting portion with a diameter of 2.8 mm Each of the lenses 56 has a maximum diameter of 14 mm. The top surface of the light cover 54 is a plane. The outer wall of each of the lenses 56 has a curved cross section, the radius of the curvature being 35 mm. A hole 57 is formed on each of the lenses 56. The light emitting portion of each of the LED lights 55 is inserted into each of the holes respectively. One end of the hole opens at the center of the bottom of the lens and extends toward a direction that is perpendicular to the top of the lens. The other end of the hole is terminated inside of the lens. A curved protrusion is formed on the top of the lens at the opening of the hole, the radius of the curvature of the curved protrusion being 3 mm.

In this embodiment, each of the curved lights in the curved light unit 5 is independently configured. Under the condition that no change is made to the other curved lights, curved lights at different angles may be replaced according to a specific requirement. On the one hand, it is easy to replace the curved lights; on the other hand, the angle of each curved light can be adjusted independently so that an optimal light coverage can be achieved more effectively.

In the above embodiments, the upper side covers 2 are connected to the two ends of the top of the base 1 through screws, and the screws are installed above the upper side covers 2. When a user needs to repair or test the components and circuits inside the base of the light bar, she/he only needs to unscrew the screws on the top to open up the upper side covers 2 and does not need to disassemble other parts of the light bar so that she/he can repair or test the components and circuits inside the base of the light bar easily and conveniently.

The present patent application uses LEDs with a diameter of 4.5 mm and the corresponding lenses have a maximum diameter of 14 mm, so that the height of the base of the light bar is only 26 mm to 29 mm, and thereby the materials for making the light bar are saved.

While the present patent application has been shown and described with particular references to a number of embodiments thereof, it should be noted that various other changes or modifications may be made without departing from the scope of the present invention.

What is claimed is:

1. A light bar comprising:
   a base (1);
   two upper side covers (2);
   a top cover (3);
   a straight light unit (4);
   a curved light unit (5) and
   a plurality of supporting legs (6); wherein:
   the top cover (3) is disposed in the middle of the top of the base (1);
   the upper side covers (2) are disposed at the two ends of the top of the base (1);
   the straight light unit (4) is connected to the straight sides of the base (1);

the curved light unit (5) is connected to the curved sides of the two ends of the base (1);

the supporting legs (6) are connected to the bottom of the base (1); and the height of the base (1) is 26 mm to 29 mm;

wherein the straight light unit (4) comprises a plurality of straight lights, each of the straight lights comprises a light base (41) and a heat dissipating plate (42), a circuit board (43) and a light cover (44) which are consecutively connected to the light base (41), the circuit board (43) is connected to a plurality of LED lights (45), and the light cover (44) comprises a plurality of lenses (46); and the curved light unit (5) comprises a plurality of curved lights, each of the curved lights comprises a light base (51) and a heat dissipating plate (52), a circuit board (53) and a light cover (54) which are consecutively connected to the light base (51), the circuit board (53) is connected to a plurality of LED light (55), and the light cover (54) comprises a plurality of lenses (56);

wherein each of the LED lights (45) has a diameter of 4.5 mm and a light emitting portion with a diameter of 2.8 mm; and each of the LED light (55) has a diameter of 4.5 mm, and a light emitting portion with a diameter of 2.8 mm;

wherein each of the lenses (46) has a maximum diameter of 14 mm and each of the lenses (56) has a maximum diameter of 14 mm;

wherein the top surface of the light cover (44) is a plane or comprises a plurality of periodic curved surfaces; and the top surface of the light cover (54) is a plane or comprises a plurality of periodic curved surfaces;

wherein the curved surfaces have a curved cross section, the radius of the curvature being 4 mm;

wherein the outer walls of the lenses (46) and the lenses (56) have a curved cross section, the radius of the curvature being 35 mm;

wherein a hole is formed on each of the lenses (46) and the lenses (56) respectively, the light emitting portions of the LED lights (45) and the LED lights (55) are inserted into the holes respectively, one end of each hole opens at the center of the bottom of the lens and extends toward a direction that is perpendicular to the top of the lens, the other end of the hole is terminated inside of the lens, a curved protrusion is formed on the top of each lens at the opening of the hole, the radius of the curvature of the curved protrusion being 3 mm;

wherein each of the curved lights in the curved light unit (5) is independently configured, and under the condition that no change is made to the other curved lights, curved lights at different angles may be replaced according to a specific requirement;

wherein the upper side covers (2) are connected to the two ends of the top of the base (1) through screws, and the screws are installed above the upper side covers (2).

2. A light bar comprising:

a base (1);

two upper side covers (2);

a top cover (3);

a straight light unit (4);

a curved light unit (5) and a plurality of supporting legs (6); wherein:

the top cover (3) is disposed in the middle of the top of the base (1);

the upper side covers (2) are disposed at the two ends of the top of the base (1);

the straight light unit (4) is connected to the straight sides of the base (1);

the curved light unit (5) is connected to the curved sides of the two ends of the base (1);

the supporting legs (6) are connected to the bottom of the base (1); and the height of the base (1) is 26 mm to 29 mm;

wherein the straight light unit (4) comprises a plurality of straight lights, each of the straight lights comprises a light base (41) and a heat dissipating plate (42), a circuit board (43) and a light cover (44) which are consecutively connected to the light base (41), the circuit board (43) is connected to a plurality of LED lights (45), and the light cover (44) comprises a plurality of lenses (46); and the curved light unit (5) comprises a plurality of curved lights, each of the curved lights comprises a light base (51) and a heat dissipating plate (52), a circuit board (53) and a light cover (54) which are consecutively connected to the light base (51), the circuit board (53) is connected to a plurality of LED light (55), and the light cover (54) comprises a plurality of lenses (56);

wherein each of the LED lights (45) has a diameter of 4.5 mm and a light emitting portion with a diameter of 2.8 mm; and each of the LED light (55) has a diameter of 4.5 mm, and a light emitting portion with a diameter of 2.8 mm;

wherein each of the lenses (46) has a maximum diameter of 14 mm and each of the lenses (56) has a maximum diameter of 14 mm;

wherein the top surface of the light cover (44) is a plane or comprises a plurality of periodic curved surfaces; and the top surface of the light cover (54) is a plane or comprises a plurality of periodic curved surfaces;

wherein a hole is formed on each of the lenses (46) and the lenses (56) respectively, the light emitting portions of the LED lights (45) and the LED lights (55) are inserted into the holes respectively, one end of each hole opens at the center of the bottom of the lens and extends toward a direction that is perpendicular to the top of the lens, the other end of the hole is terminated inside of the lens, a curved protrusion is formed on the top of each lens at the opening of the hole, the radius of the curvature of the curved protrusion being 3 mm;

wherein each of the curved lights in the curved light unit (5) is independently configured, and under the condition that no change is made to the other curved lights, curved lights at different angles may be replaced according to a specific requirement.

3. A light bar comprising:

a base (1);

two upper side covers (2);

a top cover (3);

a straight light unit (4);

a curved light unit (5) and a plurality of supporting legs (6); wherein:

the top cover (3) is disposed in the middle of the top of the base (1);

the upper side covers (2) are disposed at the two ends of the top of the base (1);

the straight light unit (4) is connected to the straight sides of the base (1);

the curved light unit (5) is connected to the curved sides of the two ends of the base (1);

the supporting legs (6) are connected to the bottom of the base (1); and the height of the base (1) is 26 mm to 29 mm; wherein the straight light unit (4) comprises a plurality of straight lights, each of the straight lights comprises a light base (41) and a heat dissipating plate (42), a circuit board (43)

and a light cover (44) which are consecutively connected to the light base (41), the circuit board (43) is connected to a plurality of LED lights (45), and the light cover (44) comprises a plurality of lenses (46); and the curved light unit (5) comprises a plurality of curved lights, each of the curved lights comprises a light base (51) and a heat dissipating plate (52), a circuit board (53) and a light cover (54) which are consecutively connected to the light base (51), the circuit board (53) is connected to a plurality of LED light (55), and the light cover (54) comprises a plurality of lenses (56).

4. The light bar of claim 3, wherein each of the LED lights (45) has a diameter of 4.5 mm and a light emitting portion with a diameter of 2.8 mm; and each of the LED light (55) has a diameter of 4.5 mm, and a light emitting portion with a diameter of 2.8 mm.

5. The light bar of claim 4, wherein each of the lenses (46) has a maximum diameter of 14 mm and each of the lenses (56) has a maximum diameter of 14 mm.

6. The light bar of claim 5, wherein the top surface of the light cover (44) is a plane or comprises a plurality of periodic curved surfaces; and the top surface of the light cover (54) is a plane or comprises a plurality of periodic curved surfaces.

7. The light bar of claim 6, wherein the curved surfaces have a curved cross section, the radius of the curvature being 4 mm.

8. The light bar of claim 5, wherein the outer walls of the lenses (46) and the lenses (56) have a curved cross section, the radius of the curvature being 35 mm.

9. The light bar of claim 5, wherein a hole is formed on each of the lenses (46) and the lenses (56) respectively, the light emitting portions of the LED lights (45) and the LED lights (55) are inserted into the holes respectively, one end of each hole opens at the center of the bottom of the lens and extends toward a direction that is perpendicular to the top of the lens, the other end of the hole is terminated inside of the lens, a curved protrusion is formed on the top of each lens at the opening of the hole, the radius of the curvature of the curved protrusion being 3 mm.

10. The light bar of claim 3, wherein each of the curved lights in the curved light unit (5) is independently configured, and under the condition that no change is made to the other curved lights, curved lights at different angles may be replaced according to a specific requirement.

11. The light bar of claim 3, wherein the upper side covers (2) are connected to the two ends of the top of the base (1) through screws, and the screws are installed above the upper side covers (2).

12. The light bar of claim 3, wherein the upper side covers (2) are connected to the two ends of the top of the base (1) through screws, and the screws are installed above the upper side covers (2).

13. The light bar of claim 4, wherein the upper side covers (2) are connected to the two ends of the top of the base (1) through screws, and the screws are installed above the upper side covers (2).

14. The light bar of claim 5, wherein the upper side covers (2) are connected to the two ends of the top of the base (1) through screws, and the screws are installed above the upper side covers (2).

15. The light bar of claim 6, wherein the upper side covers (2) are connected to the two ends of the top of the base (1) through screws, and the screws are installed above the upper side covers (2).

16. The light bar of claim 7, wherein the upper side covers (2) are connected to the two ends of the top of the base (1) through screws, and the screws are installed above the upper side covers (2).

17. The light bar of claim 8, wherein the upper side covers (2) are connected to the two ends of the top of the base (1) through screws, and the screws are installed above the upper side covers (2).

18. The light bar of claim 9, wherein the upper side covers (2) are connected to the two ends of the top of the base (1) through screws, and the screws are installed above the upper side covers (2).

19. The light bar of claim 10, wherein the upper side covers (2) are connected to the two ends of the top of the base (1) through screws, and the screws are installed above the upper side covers (2).

* * * * *